US006880383B2

(12) United States Patent
Mc Lain et al.

(10) Patent No.: US 6,880,383 B2
(45) Date of Patent: Apr. 19, 2005

(54) APPARATUS AND METHOD FOR FUEL VAPOR LEAK DETECTION

(75) Inventors: Kurt D. Mc Lain, Ortonville, MI (US); Gregory E. Labus, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/437,738

(22) Filed: May 14, 2003

(65) Prior Publication Data

US 2004/0226347 A1 Nov. 18, 2004

(51) Int. Cl.[7] .................................................. G01M 3/04
(52) U.S. Cl. .......................................... 73/49.2; 73/49.7
(58) Field of Search ................................ 73/40, 40.5 R, 73/49.2, 118.1; 123/518, 519, 520; 702/51

(56) References Cited

U.S. PATENT DOCUMENTS 4,012,944 A * 3/1977 Covington et al. ...... 73/40.5 R
4,670,847 A * 6/1987 Furuse ........................ 702/51
4,837,707 A * 6/1989 Giometti et al. .............. 702/51
5,361,622 A * 11/1994 Wall ........................... 73/49.2
5,750,888 A * 5/1998 Matsumoto et al. ....... 73/118.1

* cited by examiner

*Primary Examiner*—Charles Garber
(74) *Attorney, Agent, or Firm*—Christopher DeVries

(57) ABSTRACT

A fuel system with a pressure-sensitive monitor accumulates multiple pressure-related sample points and estimates the general trend of pressure change in a fuel system over time, thereby detecting the presence or absence of a fuel vapor leak in the fuel system.

8 Claims, 3 Drawing Sheets

APPARATUS AND METHOD FOR FUEL VAPOR LEAK DETECTION

TECHNICAL FIELD

The present invention relates to diagnostic systems for internal combustion engines and more specifically to a leak detection system for evaporative emissions control systems.

BACKGROUND OF THE INVENTION

Many automobiles on the road today have various government-mandated devices such as evaporative emission monitoring and control systems. The main purpose for including evaporative emission monitoring and control systems is to reduce the possibility of undesirable emissions from escaping into the atmosphere. A typical evaporative emission control system for a standard internal combustion engine has a filter canister containing activated carbon or charcoal for temporarily storing, trapping or adsorbing fuel vapors emitted from the fuel system when the engine is not running.

Many emission monitoring and control systems also incorporate a fuel vapor leak detection system that specifically monitors the fuel system for undesirable fuel vapor leaks. While somewhat effective, most vapor leak detection systems are typically designed to use a relatively simple two-point analysis for monitoring the pressure differential. Accordingly, a first measurement of the pressure differential is taken and then, a short time later, a second measurement of the pressure differential is taken. These two measurements are compared and the difference, if any, is extrapolated to indicate the presence or absence of a vapor leak in the fuel system. This methodology is somewhat limited, however, by the use of a relatively small sample size. For example, many leak detection systems are subject to noise and various signal spikes. Accordingly, based on the operational environment of the vehicle, the pressure differential may be artificially elevated or depressed at the time of either the first or the second measurement, leading to a false positive result or a false negative result. In either case, the possible inaccuracy of the results may lead to unnecessary repair work or continued operation of a vehicle with an undetected fuel vapor leak.

In view of the foregoing, it should be appreciated that it would be desirable to provide improved equipment and methods for monitoring fuel systems without adding significantly to the cost of the system. Furthermore, additional desirable features will become apparent to one skilled in the art from the foregoing background of the invention and following detailed description of an exemplary embodiment and appended claims.

SUMMARY OF THE INVENTION

A fuel system with a pressure-sensitive monitor suitably accumulates multiple pressure-related sample points and estimates the general trend of pressure change in a fuel system over time, thereby detecting the presence or absence of a fuel vapor leak in the fuel system.

BRIEF DESCRIPTION OF THE DRAWINGS

The exemplary embodiments of the present invention will hereinafter be described in conjunction with the appended drawings, where like designations denote like elements, and.

DETAILED DESCRIPTION OF THE INVENTION

Various embodiments of the present invention provide devices and/or methods for detecting fuel vapor leaks in an automobile fuel system using multiple sample points to measure the general trends of change in pressure (positive or negative) created in the fuel system of an automobile. In general, the pressure change trend is typically fairly linear and, accordingly, substantial accuracy in predicting the trend can be obtained by using an appropriate series of calculations. As the number of data observations from the system pressure monitor increases, pressure change trends can be tracked with improved accuracy. Fuel vapor leaks can be readily identified by interpreting the observed trends.

Figure 1:
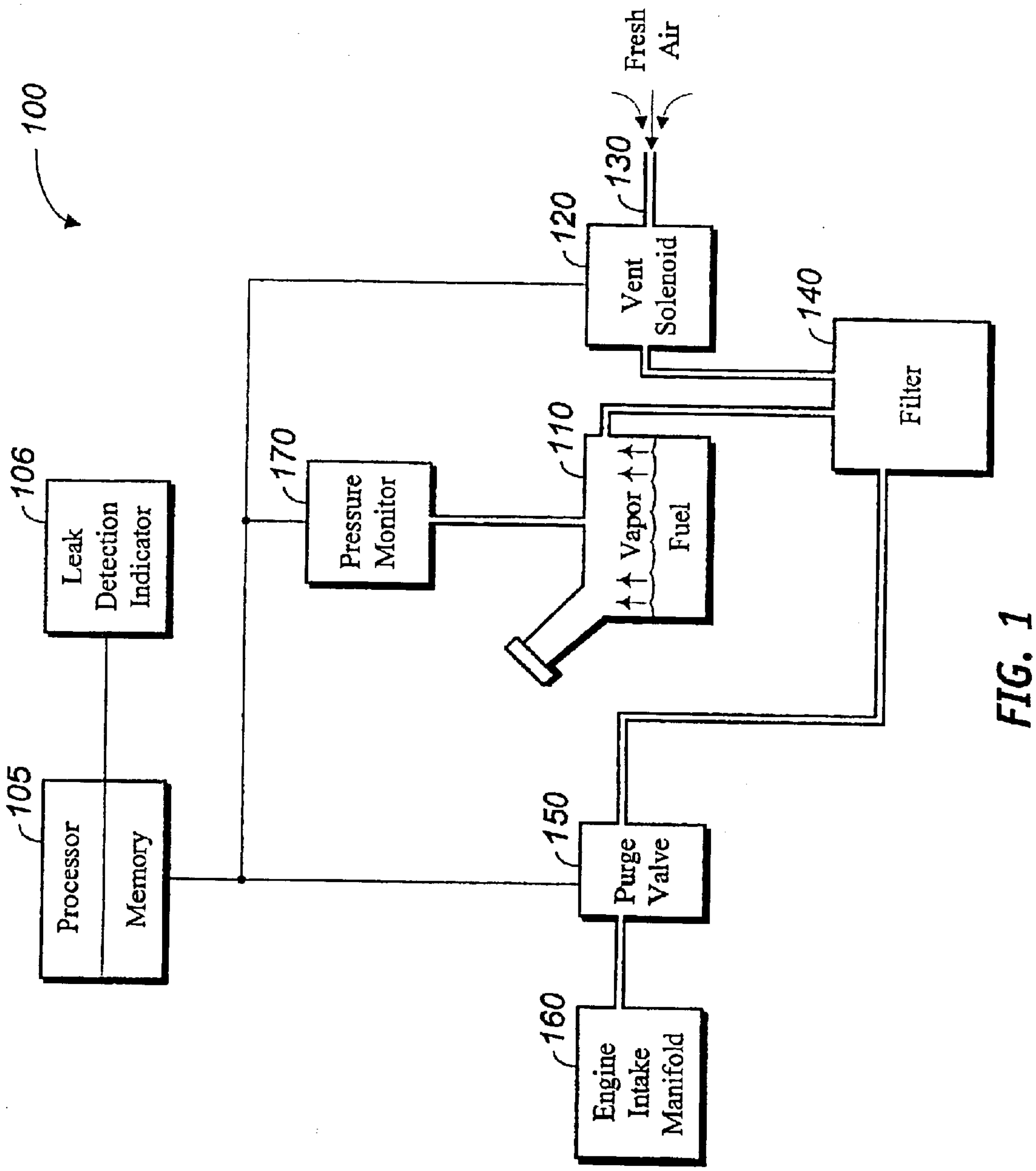
FIG. 1 is a schematic block diagram of a leak detection system in accordance with an exemplary embodiment of the present invention.

Referring now to FIG. 1, a fuel vapor leak detection system 100 in accordance with an exemplary embodiment suitably includes a processor 105, a fuel tank 110, a pressure monitor 170, a vent solenoid 120, an air vent 130, a filter 140, a purge valve 150, and an engine intake manifold 160. Processor 105 is appropriately coupled to pressure monitor 170, purge valve 150, and vent solenoid 120 to act as a control mechanism for fuel vapor leak detection mechanism 100.

Processor 105 is typically a microprocessor that controls the various elements of fuel vapor leak detection system 100 and is capable of interacting with the various components of fuel vapor leak detection system 100 to detect fuel vapor leaks. In one embodiment, processor 105 is an embedded microprocessor and may be implemented as a stand-alone or dedicated central processing unit (CPU) or may be integrated into other existing components. Additionally, the fuel vapor detection functions of processor 105 may be implemented using any number of related processors, with each processor performing various aspects of the desired functionality. In any case, processor 105 will typically have some type of associated memory space that may be accessed by processor 105.

While depicted in FIG. 1 as an integrated CPU/memory module, the memory space of processor 105 may alternatively or additionally be implemented as a collocated memory storage area or a separate portion of another system, located in a different physical location than processor 105. The memory space of processor 105 may be used for storing various intermediate results and for calculating the various values used to determine the presence of a fuel vapor leak in fuel vapor leak detection system 100.

Air vent 130 is coupled to vent solenoid 120 and is used to transmit fresh air into filter 140. Filter 140 may be any type of filtering device capable of trapping or adsorbing fuel vapors that is presently known or subsequently developed. In various embodiments, filter 140 is a charcoal canister filter and fuel vapors from fuel tank 110 are vented to filter 140 and trapped therein. During the normal operation of the internal combustion engine, vent solenoid 120 and purge valve 150 are opened and fresh air is vented through filter 140. This fresh air purges filter 140 and the fuel vapors are transported to engine intake manifold 160 where they are introduced into the combustion chambers of the internal combustion engine and ignited during normal engine operation.

Pressure monitor 170 is a pressure sensitive monitoring device that is coupled to processor 105 and is capable of communicating with the processor 105 to monitor and report the status of the vapor pressure in fuel tank 110. Additionally, various values associated with the pressure-monitoring activities of pressure monitor 170 can be stored and retrieved using the memory space associate with processor 105.

To detect the presence of leaks in fuel vapor leak detection system 100, processor 105 closes vent solenoid 120 and opens purge valve 150. After vent solenoid 120 is closed and purge valve 150 is opened, a vacuum is applied to fuel tank 110 and the associated evaporative emission space. Purge valve 150 is then closed and processor 105 periodically monitors pressure readings from pressure monitor 170 over a period of time to detect a possible fuel vapor leak. An exemplary methodology for fuel vapor leak detection in is further explained below in conjunction with FIGS. 4–5.

Figure 2:
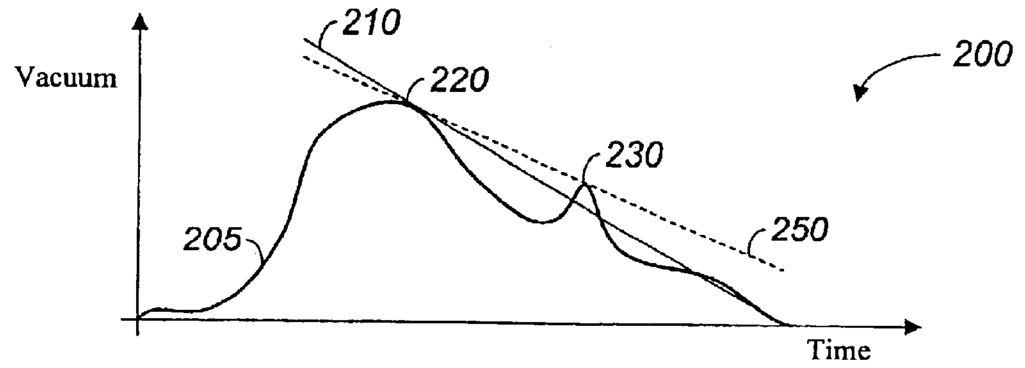
FIG. 2 is a graphical representation of a vacuum curve.

Referring now to FIG. 2, a graph 200 of an exemplary vacuum curve 205 for a fuel system is shown. FIG. 2 represents one type of issue that can arise in many typical fuel vapor leak detection systems. In FIG. 2, a general trend line 210 representing the actual slope of the decay for vacuum curve 205 is shown. Additionally, a calculated slope line 250 is created using first measurement point 220 and second measurement point 230. As shown in FIG. 2, the slope of calculated slope line 250 is lower than the slope of general trend line 210. A transitory spike at second measurement point 230 has therefore resulted in a non-representative calculated slope line 250.

Figure 3:
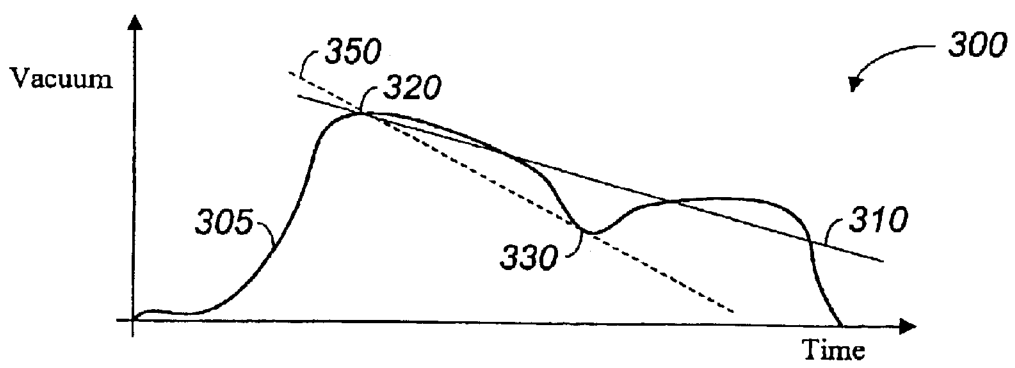
FIG. 3 is a graphical representation of another vacuum curve.

Referring now to FIG. 3, a graph 300 of vacuum curve 305 for a fuel system is shown. FIG. 3 represents another type of problem that can occur in many typical fuel vapor leak detection systems. In FIG. 3, a general trend line 310 representing the actual slope of the decay for vacuum curve 305 is shown. As with FIG. 2, a calculated slope line 350 is created using first measurement point 320 and second measurement point 330. As shown in FIG. 3, the slope of calculated slope line 350 is greater than the slope of general trend line 310. The depression in vacuum curve 305 at second measurement point 330 has created a non-representative calculated slope line 350. Accordingly, in some fuel vapor leak detection systems, a depression or spike at a pressure measurement point can result in testing inaccuracies.

Figure 4:
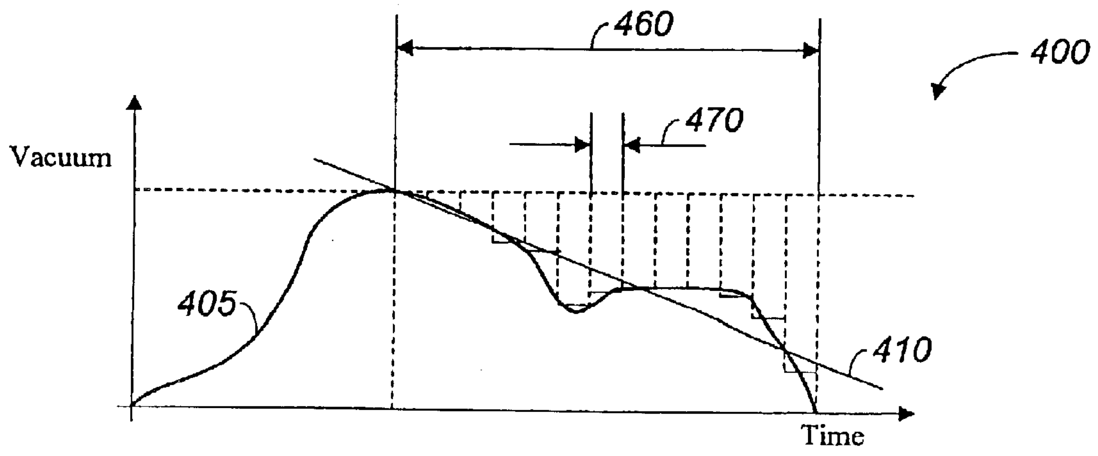
FIG. 4 is a graphical representation of a model used to calculate the slope of a vacuum curve in accordance with an exemplary embodiment of the present invention.
Figure 5:
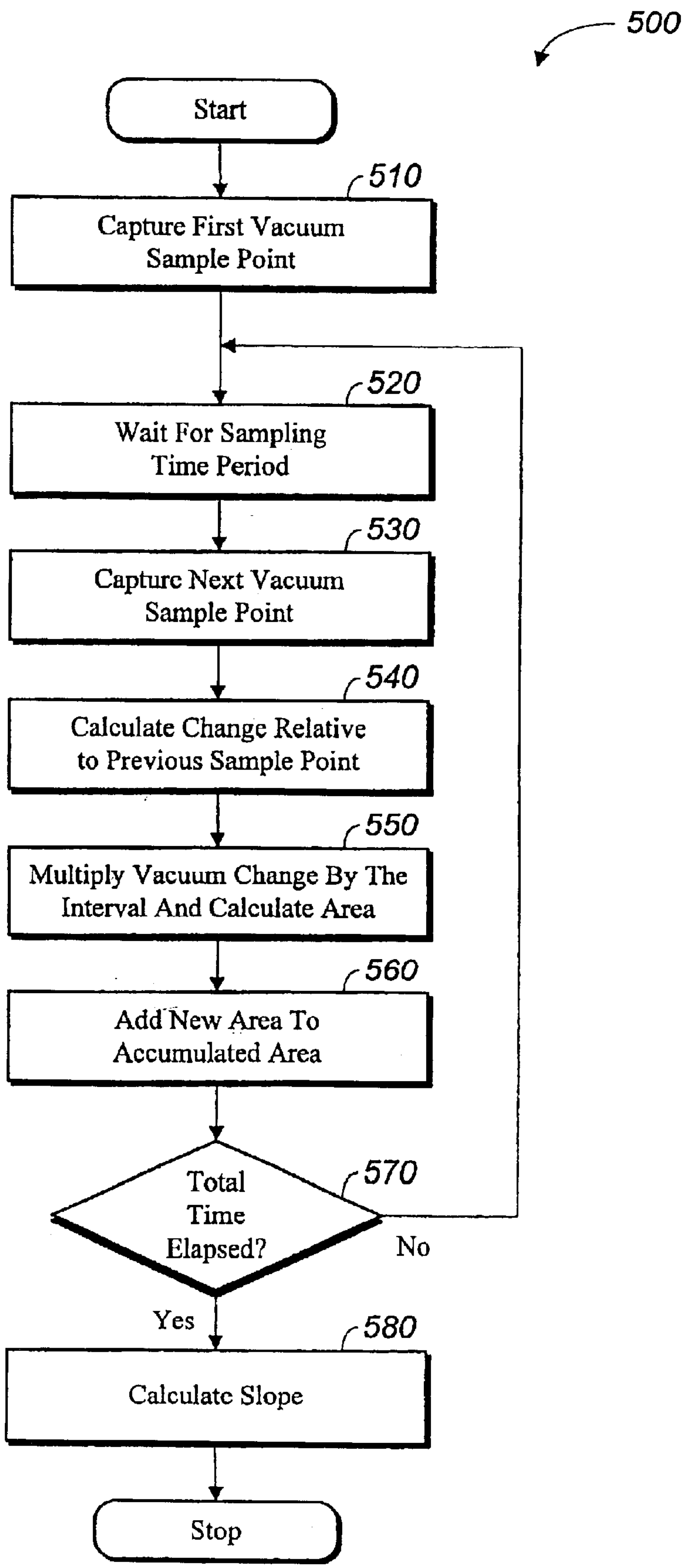
FIG. 5 is a flow chart of a method for leak detection in accordance with an exemplary embodiment of the present invention.

Referring now to FIGS. 4 and 5, one specific methodology for implementing a leak detection system in accordance with an exemplary embodiment of the present invention is depicted. It should be noted that the "area under the curve" technique illustrated is only one possible use of the pressure change trend method, and other methods may also be advantageously applied within the framework of the present invention. Examples of other suitable methodologies include various non-linear regression techniques such as "least squares," "exponential decay," or "fractional power curve." The "area under the curve" method illustrated herein has been chosen for several different reasons. First, this method can adequately approximate the trend of the pressure change. Second, the starting point is a relatively reliable reference point, and obviates the need for calculating an offset. Finally, this method is generally considered to be computationally efficient and relatively straightforward to implement in present designs. While other methods may be employed, other techniques may include additional, alternative and/or enhanced processing components.

Referring now to FIG. 4, a graph 400 of vacuum curve 405 for a fuel system is shown. In FIG. 4, a general trend line 410 representing the actual slope of the decay for vacuum curve 405 is shown. As shown in FIG. 4, an overall time period 460 for calculating the slope of vacuum curve 405 encompasses a series of smaller time periods or time slices 470. The amount of time in each time slice 470 is multiplied by the measured vacuum at the point in time for each time slice 470, yielding an approximation for the area under curve 405 associated with each time slice 470. In at least one embodiment, each area for each time slice 470 is accumulated throughout overall time period 460, giving an approximation of the total area under vacuum curve 405 at the end of overall time period 460.

Referring now to FIG. 5, an overall method 500 for detecting leaks in accordance with an exemplary embodiment of the present invention is depicted. As shown in FIG. 5, method 500 begins with a preliminary vacuum sample (step 510) to set a baseline for the system. This initial vacuum pressure sample point is stored in memory for later comparison. After an appropriate period of time (step 520), a subsequent vacuum sample is taken (step 530). This value is compared with the previously collected sample and a change in vacuum, relative to the previous value is calculated (step 540). The change in value for the vacuum as represented by the change in value for the two samples is multiplied by the time interval to calculate an area (step 550). This area is then accumulated with any previously calculated area (step 560). Next, the total elapsed time for the sampling process is compared to the total time allotted for sampling. If the total elapsed time is less than the total allotted time (step 570="No"), then method 500 returns to step 520 and cycles through another sampling period. If, however, the total elapsed time is equal to or greater than the allotted time (step 570="Yes"), then the accumulated area will be used to calculate the slope (step 580) using the formula shown below where Area is equal to the total accumulated area.

$$\text{Slope}=(2*\text{Area})/(\text{Total Time})^2$$

Knowing the slope and the amount of time in the total allotted time period, the rate of decay of the vacuum in the fuel system can be determined. This information can be compared to standardized values for a given fuel system and used to determine whether or not a leak is present. If a fuel vapor leak is detected, the presence of the fuel vapor leak can be communicated by a leak detection indicator and/or a signal sent to another portion of the vehicle's control system (e.g. to a dashboard display system or the like) For example, a flashing light or other visual indicator may be activated. If included, the fuel leak detection indicator may be activated by the processor. Alternatively, a flag bit in a memory location may be set to indicate the presence of the fuel vapor leak, or any other similar action may be taken in response to the detected fuel vapor leak. Accordingly, various embodiments of the leak detection indicator may take many different forms.

While total area has been described above as being calculated by multiplying each sample point by the time differential and then summing the intermediate values in a piece-wise fashion, in various equivalent embodiments a single multiplication could be performed at the end of the accumulation of sample points since the time slice may be a fixed period of time to eliminate the need for performing a separate multiplication for each sample point. Further, the results of the slope calculation can be used to provide additional input for other detection algorithms, thereby enhancing the overall effectiveness of the system. For example, by combining the slope information with other system parameters such as temperature and total size of the vapor space, an approximate size for the fuel leak may be determined. Additional statistical processing could be performed to account for system variations and the like.

Although the methods of the present invention have been described in the context of a vacuum, a similar method could be employed by pressuring the evaporative emission space. Accordingly, the methods contemplate creating either a positive pressure differential (overpressure with respect to atmospheric pressure) or, as discussed in conjunction with the FIGS., a negative pressure differential (vacuum).

Accordingly, various embodiments of the leak detection system utilize multiple sample points taken over a period of time to approximate the trend of pressure change in a fuel vapor system. By measuring the trend of change over time, a more robust diagnostic test can be achieved with reduced possibility of skewed results due to noise and signal spikes.

While certain elements have been presented in the foregoing detailed description of the exemplary embodiments, it should be appreciated that a vast number of variations in the embodiments exist. The various embodiments presented herein are only examples, and are not intended to limit the scope, applicability, or configuration of the invention in any way. Rather, the foregoing detailed descriptions provide a convenient road map for implementing the exemplary embodiments of the invention. It should also be understood that various changes may be made in the function and arrangement of elements described in the exemplary embodiments without departing from the scope of the invention as set forth in the appended claims.

What is claimed is:

1. A leak detection apparatus comprising:

a fuel system;

a pressure monitor coupled to said fuel system and configured to produce data sample points indicating the pressure in the fuel system;

a processor coupled to said pressure monitor and configured to receive at least three sample points from the pressure monitor and to detect a leak in said fuel system as a function of the at least three sample points;

wherein the processor is further configured to receive at least three sample points from the pressure monitor and to detect the leak by computing a slope of a fuel pressure curve connecting the at least three sample points; and wherein the slope of a fuel pressure curve is computed according to:

$$Slope=(2*Area)/(Total\ Time)^2$$

wherein Area represents the area wider the fuel pressure curve, and wherein Total Time represents the time elapsed between the first and last of the at least three sample points.

2. The leak detection apparatus of claim 1 further comprising a memory space coupled to said processor, wherein said processor is configured to accumulate said at least three sample points in said memory space and to determine a pressure change trend based on said at least three sample points.

3. The leak detection apparatus of claim 2 wherein said fuel system comprises:

a fuel tank;

a purge valve coupled to said fuel tank and controlled by said processor; and a vent solenoid coupled to said fuel tank and controlled by said processor.

4. The leak detection apparatus of claim 1 wherein said pressure-sensitive monitor comprises a vacuum sensor.

5. The leak detection apparatus of claim 1 further comprising a leak detection indicator coupled to said processor, wherein said leak detection indicator is configured to indicate the presence of a leak in said fuel system.

6. The leak detection apparatus of claim 1 further comprising a filter coupled between said fuel tank and said vent solenoid, said filter also coupled between said fuel tank and said purge valve.

7. The leak detection apparatus of claim 1 further comprising a leak detection indicator coupled to said processor, wherein said processor is configured to activate said leak detection indicator when fuel vapor leak is detected.

8. A leak detection apparatus comprising:

a fuel system;

a pressure monitor coupled to said fuel system and configured to produce data sample points indicating the pressure in the fuel system;

a processor coupled to said pressure monitor and configured to receive at least three sample points from the pressure monitor and to detect a leak in said fuel system as a function of the at least three sample points;

wherein a leak is detected by the leak detection apparatus as a function of the changes in differential pressure of said at least three sample points;

wherein the processor computes a slope of a fuel pressure curve connecting the at least three sample point; and wherein the slope of a fuel pressure curve is computed according to:

$$Slope=(2*Area)/(Total)^2$$

wherein Area represents the area under the fuel pressure curve, and Total Time represents the time elapsed between the first and last of the at least three sample points.

* * * * *